(12) United States Patent
Roper et al.

(10) Patent No.: US 9,866,333 B2
(45) Date of Patent: Jan. 9, 2018

(54) THROUGH-THE-EARTH EMERGENCY RADIO SYSTEM

(71) Applicant: VITAL ALERT COMMUNICATION INC., Thronhill (CA)

(72) Inventors: Michael James Roper, Ottawa (CA); Peter Kwasniok, Dunrobin (CA); Vladimir Puzakov, Kanata (CA)

(73) Assignee: VITAL ALERT COMMUNICATION INC., Thornhill, Ontario (CA)

( * ) Notice: Subject to any disclaimer, the term of this patent is extended or adjusted under 35 U.S.C. 154(b) by 0 days.

(21) Appl. No.: 15/304,892

(22) PCT Filed: Apr. 24, 2015

(86) PCT No.: PCT/CA2015/000268
§ 371 (c)(1),
(2) Date: Oct. 18, 2016

(87) PCT Pub. No.: WO2015/161360
PCT Pub. Date: Oct. 29, 2015

(65) Prior Publication Data
US 2017/0187471 A1    Jun. 29, 2017

Related U.S. Application Data

(60) Provisional application No. 61/984,329, filed on Apr. 25, 2014.

(51) Int. Cl.
*H04B 13/02* (2006.01)
*H01Q 7/00* (2006.01)
*H04B 1/38* (2015.01)
*H04B 1/3827* (2015.01)
*H04B 1/40* (2015.01)
*H04L 27/26* (2006.01)
*H04L 25/49* (2006.01)
(Continued)

(52) U.S. Cl.
CPC ........... *H04B 13/02* (2013.01); *H01Q 1/2291* (2013.01); *H01Q 7/00* (2013.01); *H04B 1/034* (2013.01);
(Continued)

(58) Field of Classification Search
CPC ...... H04B 13/02; H04B 1/034; H04B 1/3827; H04B 1/38; H04B 1/40; H04L 27/2602;
(Continued)

(56) References Cited

U.S. PATENT DOCUMENTS

2004/0102219 A1* 5/2004 Bunton .................... H04B 5/02
455/560
2004/0266497 A1* 12/2004 Reagor .................. H04B 13/02
455/575.1
(Continued)

OTHER PUBLICATIONS

CIPO, Examiner's Requisition for CA Application No. 2,946,441 dated Nov. 17, 2016.
(Continued)

*Primary Examiner* — Syed Haider
(74) *Attorney, Agent, or Firm* — Norton Rose Fulbright Canada LLP; Maya Medeiros

(57) ABSTRACT

There is provided a Through the Earth Emergency Radio (TER) method and apparatus for creating a communications link that can penetrate the earth or other thick, solid barriers. The communication link is used to connect mobile radios or other conventional wireless devices located below ground and on the surface. The through the earth communication link uses a multi-carrier modulation method that minimizes the impact of AC power line noise by locating each carrier between the harmonic frequencies of the AC power line noise.

27 Claims, 9 Drawing Sheets

(51) Int. Cl.
*H01Q 1/22* (2006.01)
*H04B 1/034* (2006.01)
*H04W 4/22* (2009.01)
*H01Q 1/27* (2006.01)

(52) U.S. Cl.
CPC ............ *H04B 1/38* (2013.01); *H04B 1/3827* (2013.01); *H04B 1/40* (2013.01); *H04L 25/4902* (2013.01); *H04L 27/26* (2013.01); *H04L 27/2602* (2013.01); *H04W 4/22* (2013.01); *H01Q 1/273* (2013.01)

(58) Field of Classification Search
CPC ...... H04L 25/4902; H04L 27/26; H04W 4/22; H01Q 7/00; H01Q 1/2291; H01Q 1/273
See application file for complete search history.

(56) References Cited

U.S. PATENT DOCUMENTS

| | | | | |
|---|---|---|---|---|
| 2008/0240209 | A1* | 10/2008 | Levan | H04B 13/02 375/218 |
| 2009/0140852 | A1* | 6/2009 | Stolarczyk | H01Q 1/04 340/539.13 |
| 2010/0311325 | A1* | 12/2010 | Marshall | H04B 13/02 455/40 |
| 2012/0076178 | A1 | 3/2012 | Burris et al. | |
| 2015/0036482 | A1* | 2/2015 | Schmidt | G01D 21/00 370/221 |

OTHER PUBLICATIONS

Wang, W., et al., Design and Implementation of Communication Based on Multi-carrier modulation in Mine, 2010 International Conference on Management and Service Science (MASS), pp. 1-4, Aug. 26, 2010 (Aug. 26, 2010).

Bernstein, S. L., Long-Range Communications at Extremely Low Frequencies, Proceedings of the IEEE, vol. 62, No. 3, pp. 292-312, Mar. 1974 (Mar. 1974).

Raab, F. H., Signal Processing for Through-the-Earth Electromagnetic Systems, IEEE Transactions on Industry Applications, vol. 24, No. 2, pp. 212-216, Mar./Apr. 1988 (Mar. 4, 1988).

Carroll Technologies Group White Paper, "Through-The-Earth" Communications: Breakthrough Solution for Miner Safety, pp. 1-10, Apr. 2012 (Apr. 2012).

* cited by examiner

THROUGH-THE-EARTH EMERGENCY RADIO SYSTEM

TECHNICAL FIELD

The present invention relates to the field of through-the-Earth (TTE) communications and more specifically, to TTE systems for use during emergency situations.

INTRODUCTION

In an emergency situation such as the aftermath of a fire or explosion in a subway tunnel or other structure below ground, there is a need for emergency workers to enter the tunnel and perform rescue and fire-fighting work. In this type of event, any existing communications system that may have been in place is usually no longer operational. In order to coordinate the work and ensure the safety of the emergency workers, it is highly desirable for them to have a communications link to the surface. Through-the-Earth (TTE) communications systems are capable of communicating through solid rock and other solid material, for example the overburden above a subway tunnel. This overburden may typically consist of material including various types of rock, clay, sand, gravel and concrete, some of which may have high conductivity due to the presence of ions carried in solution, or, in the case of concrete, steel reinforcement. While many subway tunnels and the basement areas of buildings are less than 100 m below the surface, in order to provide a communications link through this material, TTE communications systems must operate at low frequencies, typically in the ULF frequency band between 300 Hz and 3 kHz.

Electromagnetic plane waves cannot be launched in this frequency band using conventional antenna structures due to the extremely large wavelengths of the signals involved. Instead, TTE communication systems use either magnetic induction or current injection to transmit a signal through solid materials. In magnetic induction, a transmit antenna consisting of a wire loop driven by a modulated current is used to generate a time-varying magnetic field which is then intercepted by a second loop antenna at the far end of the link. The receiving loop produces an output voltage proportional to the modulated magnetic field. This voltage is then filtered and demodulated to recover the modulated data as in conventional radio systems. In the current injection method, the transmitter is connected to a pair of widely spaced electrodes inserted directly into the ground or overburden. The modulated transmitter output creates a potential difference between the electrodes which causes a current to flow and diffuse through the overburden. A second pair of electrodes placed at the surface will detect the potential difference caused by this current flow. This output voltage can then be filtered and demodulated to recover the modulated data, as above.

Both these techniques generally require one or more wires to be deployed to create a loop antenna or connect to the electrodes, with lengths >30 m typical for operation to depths of 100 m. This is not practical in an emergency situation, where the space may be limited and the transmit antenna wires may be damaged during operations. In the presence of water or hazardous atmospheres, the transmit antenna wires may also present a safety hazard due to the high currents and voltages used. The installation of electrodes for current injection is also not practical for equipment that must be portable and rapidly deployed. In addition, in urban areas, the ULF frequency band also contains a large amount of man-made electromagnetic noise, created by electrical machinery and power lines. This noise is encountered above ground and below ground and will be present after an emergency, emanating from power lines unaffected by the event.

SUMMARY

Embodiments described herein may provide a Through-The-Earth radio for emergency communications.

Embodiments described herein may provide a method and apparatus for providing wireless communications by means of a very low frequency magnetic or electric field capable of penetrating the earth or other solid, thick barriers. Embodiments described herein may provide a system which can be carried and deployed for emergency communications and can also tolerate man-made electromagnetic noise originating from AC power lines and equipment. There is also described a method for transmitting a signal through the earth that can tolerate a high level of man-made electromagnetic noise. The present system may not require long wire antennas to be deployed, may be safe in hazardous conditions and may be robust against the effects of power line noise.

In accordance with an aspect, there is provided a Through-the-Earth (TTE) Emergency Radio comprising a housing, a transmitter, a transmit antenna, a receiver, at least one receive antenna, a power supply, a wireless communications port, and a signal processor connected to the transmitter and the receiver and configured to modulate and demodulate a waveform with at least two separate inter-harmonic frequencies.

In accordance with another aspect, there is provided a method of providing a Through-the-Earth (TTE) communication link, the method comprising: determining a fundamental frequency of an alternating current (AC) power line noise; inputting a data stream representing a text message, digitally coded voice or other data; and performing an inverse Fourier transform on a block of N data and overhead symbols to create a single Inter-Harmonic Modulation (IHM) waveform containing N separate modulated carriers. In accordance with some embodiments, there may be a frequency $M_{th}$ carrier $F_m=(M+0.5)*F_{ac}$, where M is a positive integer with a range of 1 to N and $F_{ac}$ is a fundamental AC frequency.

In an aspect, embodiments described herein may implement a multicarrier modulation method as a means of improving the SNR on a given communication link. A method or device may involve transmitting data over a multiplicity of mathematically related carriers such that the signal lies between the harmonic frequencies of man-made noise.

In an aspect, embodiments described herein may provide a method or device that may involve using heavy amplitude limiting to obtain a high power efficiency; the optimum crest factor for mine emergency communications which feature short text messages and voice codecs operating below 2400 bps may be 1.4, or within a predefined range thereof. A practical example implementation may be for mine communications.

In an aspect, embodiments described herein may provide a method or device that may involve using error correction coding (such as Reed-Solomon coding) to correct data errors caused by amplitude clipping.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
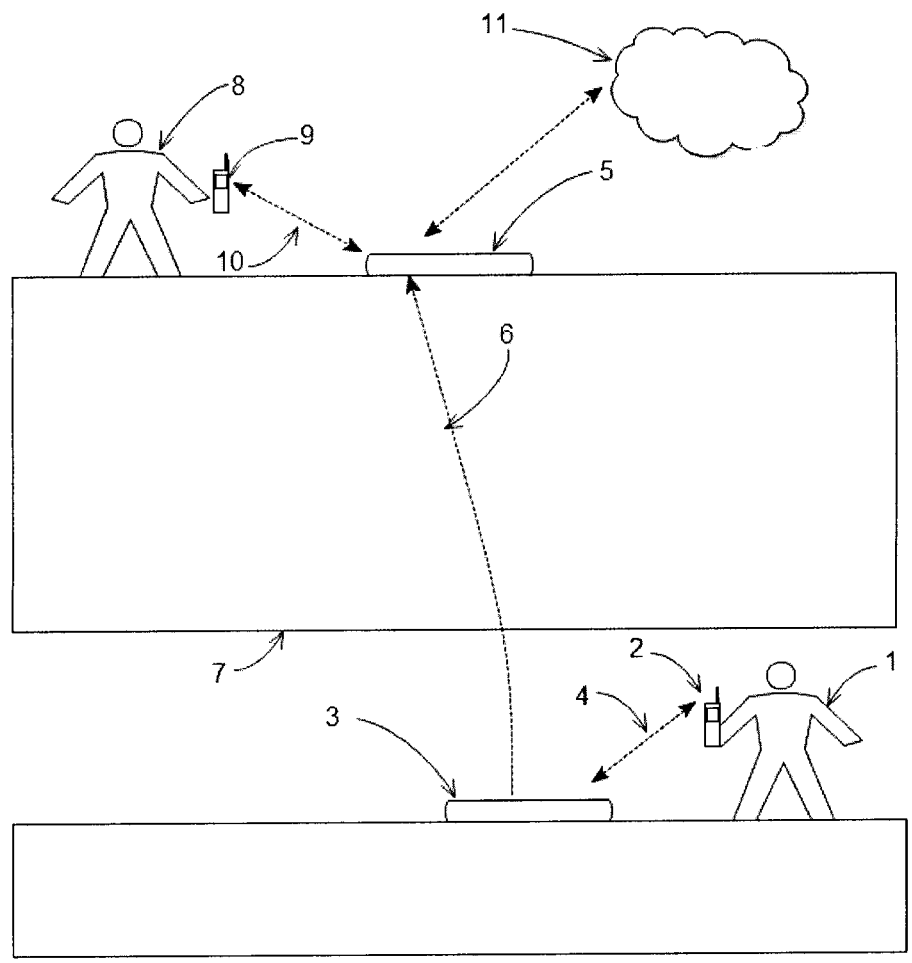
FIG. 1 is a system diagram of the TTE Emergency Radio system.

In one embodiment, a Through-the-Earth Emergency Radio (TER) is used at each end of a Through-the-Earth (TTE) communications link to provide communication between a surface and a location below the earth. FIG. 1 is a system level diagram of this configuration. A below ground worker 1 uses a mobile radio 2 to send voice or text data to TER 3, which is located below ground, over a conventional radio link 4. The TER 3 sends the voice and data information to a second TER 5 which is located on the surface by means of a TTE link 6 provided by a modulated magnetic field. The frequency of the modulated magnetic field 6 is such that it is able to penetrate the overburden 7, and may typically be in the range 800 Hz to 4000 Hz. TER 5 then transmits the voice and data information to a worker 8 located at the surface via a second radio 9 and conventional wireless link 10. The data may also be transmitted into a voice or data network 11.

Magnetic induction may be used for the TTE link 6 to allow the system to be mobile and rapidly deployed. Both the transmit and receive loop antennas used for electromagnetic induction are incorporated into the TER 3, 5 housing, which may be a fully sealed unit with no external connectors. The housing may also be water-proof. The ingress of any dangerous gasses, which might ignite in the event of an internal fault generated spark, may be prevented by filling the interior with a closed cell foam. The magnitude of the magnetic field transmitted by each TER 3, 5 is limited by the small area of the antenna needed for portability and the voltage and capacity of the battery, which may be based on Lithium-ion technology to minimize its weight. Other battery technologies, such as Lithium iron phosphate, Nickel Metal Hydride or Nickel-Cadmium may also be used.

Figure 2:
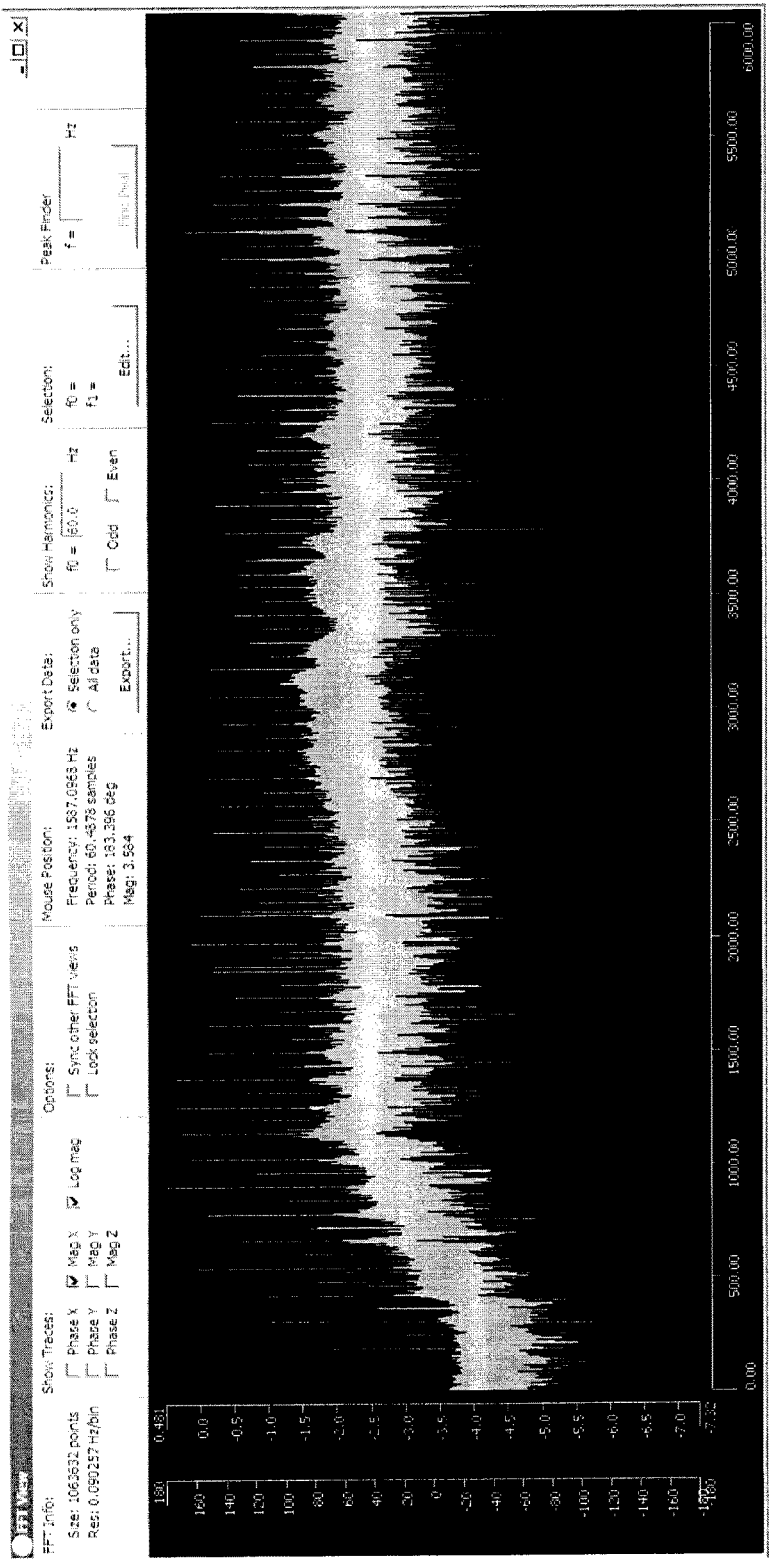
FIG. 2 is a spectrum plot of the man-made noise in an urban environment.

Operation at frequencies below 10 kHz means that the receiver will also be exposed to man-made noise, particularly from power distribution lines in the vicinity. FIG. 2 is a spectrum plot of this noise waveform which shows how the noise extends right through the frequency band used for TTE communications. The well-defined peaks in the noise spectrum occur at the harmonic frequencies of the AC power distribution network. The presence of this noise can cause data symbols to be incorrectly demodulated, generating errors in the received data over a wide range of noise levels which are manifested to the end-user as distorted voice communications or corrupted text data. If the noise level is sufficiently high it can prevent the receiver from acquiring frequency or phase synchronization with the transmitter, blocking the TTE transmission completely. The noise is generally concentrated at the harmonics of the power-line frequency. Due to the constraints on the transmitter and antenna, the magnetic field received at a distance of 100 m may not be strong enough to allow reliable communications using a conventional modulation method such as FSK or QPSK. The TER 3, 5 therefore uses Inter-Harmonic Modulation in which the signal is transmitted on multiple modulated carriers whose center frequency is located at frequencies between the power line harmonics and where the noise level is typically 20 to 30 dB lower than at the harmonic frequencies. This provides a corresponding improvement in the sensitivity of the receiver, compared to a conventional single carrier TTE modulation and provides a more reliable communications link between the two TERs 3, 5.

Figure 3:
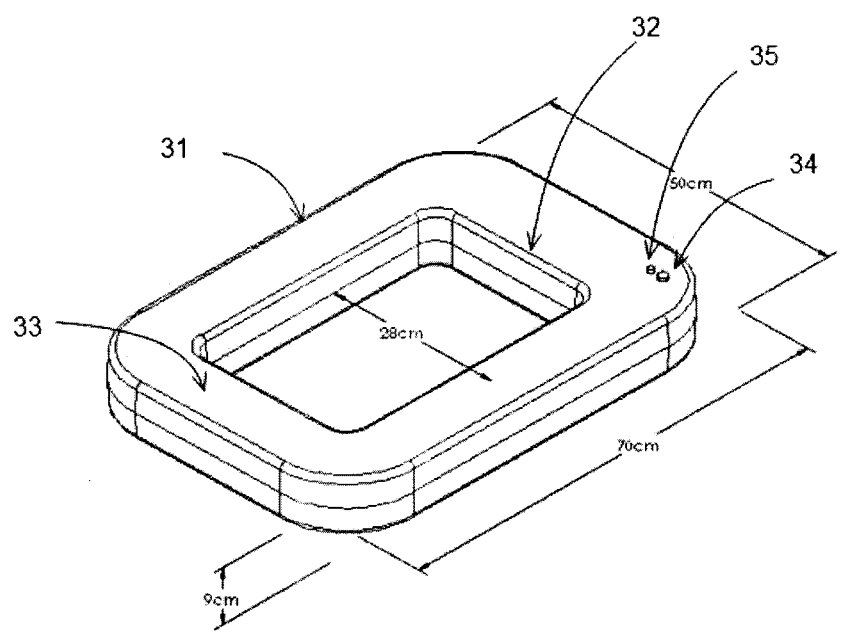
FIG. 3 is a drawing of the TTE Emergency Radio housing.

In some embodiments, a TER housing is in the form of a sealed annular ring made from fibreglass epoxy or vinyl ester composite or other non-conductive materials, such as acrylic plastic, acrylonitrile butadiene styrene (ABS), silicone rubber, fibre reinforced plastic, ethylene propylene diene monomer rubber, or composite polymer materials. Exemplary dimensions of the TER housing may be 70×50×9 cm and an exemplary weight is less than 8 kg so that it may easily be carried and deployed by one person. It may be carried hands-free on a person's back, using a simple harness or by attaching it to an existing breathing apparatus. FIG. 3 illustrates an exemplary embodiment of the TER housing 31 which may contain the transmit and receive antennas and all the components of the radio. The electronics and battery may be housed in a shielded chassis located at a thickened end 32 of the housing 31, while the receive antennas are located at the opposite end 33 of the housing 31 to minimize noise pick up from the active electronics. In this embodiment, the only operator control is a magnetic on/off switch 34 mounted on the outside of the housing 31 which controls a relay inside the unit. A set of LED status indicators are also housed inside the unit and are viewed through a transparent window 35 molded into the housing 31.

Figure 4:
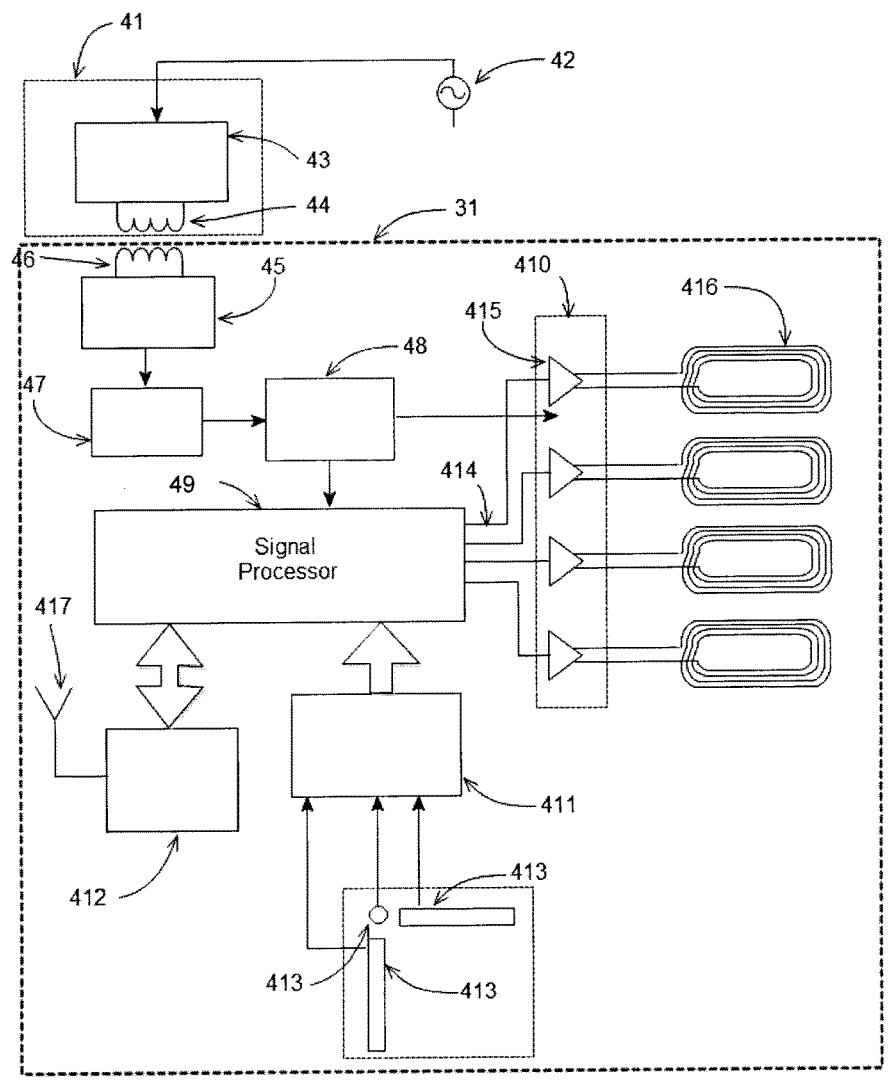
FIG. 4 is a block diagram or the TTE Emergency Radio.

FIG. 4 is an exemplary block diagram of the TER 3, 5 which comprises the housing 31 that encloses the electronics and antennas used for communications, and a charging cradle 41 used to support and charge the TER 3, 5 when it is not in use. The charging cradle 41 may be powered from an external AC source 42 and contains a power converter 43 and inductive charging loop 44. The inductive charging loop 44 transfers power from the cradle 41 to a TER battery charger 45 via a second loop 46 located inside the housing 31. By this means, a TER battery 47 may be maintained in a fully charged state while located on the cradle 41, without the need for a wired connection that would penetrate the enclosure.

When turned on, a power supply 48 converts the battery voltage to the different power supply voltages required by a signal processor 49 and a transmitter 410, a receiver 411 and a radio module 412. Three TER receive antennas 413 may be arranged along orthogonal axes so that a signal can be received by the TER 3, 5 from any direction without having to align the housing. The TER 3, 5 may thus be deployed simply by laying it on a horizontal surface, as illustrated in FIG. 1. The receiver antennas 413 may be located at the opposite end of the housing 31 from the other electronics in order to minimize their coupling to noise sources in the rest of the electronic circuits. The signals from the receiver antennas 413 are amplified, filtered and sampled by the three channel receiver 411 before being sent in digital form to the signal processor 49. When receiving, the signal processor 49 performs the functions of timing recovery, synchronization, demodulation and decoding on the signals received from the three antennas 413.

When transmitting, the signal processor 49 synthesizes a multi-carrier waveform in the form of a PWM signal 414 that is used to drive the transmitter 410. In some embodiments, the transmitter 410 comprises four separate full bridge circuits 415 (i.e. PWM amplifiers), each connected to a separate antenna loop 416. These loops may be connected and arranged such that the fields from each loop combine additively to increase the strength of the transmitted magnetic field.

The TER 3, 5 acts as a wireless communication port and may comprise a separate low power radio module 412 and antenna 417, both mounted within the housing 31. Voice or data received by the signal processor 49 from a far end of the TTE link, on the surface for example, are sent to the 2-way radio 412 and transmitted to a mobile radio device 2, 9 located outside the TER. Voice or data communications transmitted by the mobile radio devices 2, 9 are received by the radio module 412 and sent to the signal processor 49 and transmitted to the far end of the TTE link. The radio module 412 may be a public safety radio normally used by emergency workers above ground, such as those operating in the 800 MHz, UHF or VHF bands. Alternatively the radio module 412 may be a Wi-Fi access point capable of communicating with mobile Wi-Fi enabled devices. Both voice and data may be forwarded to and from the TER 3, 5 to the external radio 2, 9.

Figure 5:
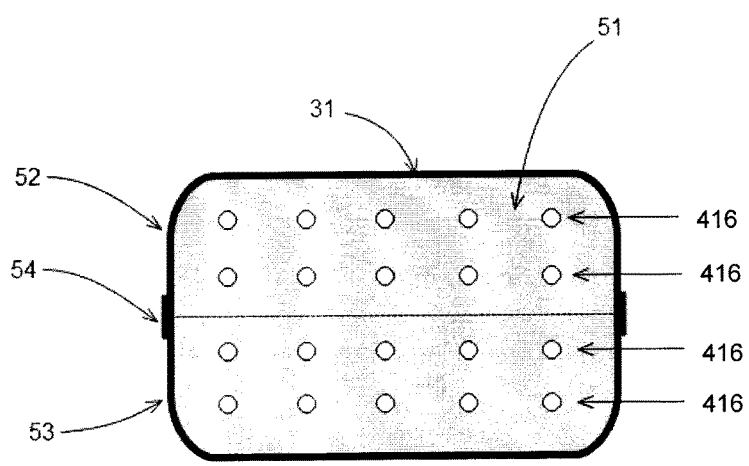
FIG. 5 is a cross-section drawing of the TTE Emergency Radio housing.

FIG. 5 is a cross-sectional view of an exemplary embodiment of the TER housing 31 containing a transmit antenna comprising four separate spiral loops 416 which are constructed in a single plane from insulated wire. The separate loops, and the turns of each loop, may be spaced apart to minimize the impedance of the transmitter load and are supported by a foam core 51 which occupies all the space inside the enclosure. The TER may be built in two mirrored halves 52, 53 allowing the transmit antenna loops 416 to be installed and encapsulated. After installing and connecting the rest of the electronics, the two halves 52, 53 may be glued together and then sealed around the perimeter 54, making the entire assembly waterproof. Because the transmitter antenna is encapsulated, the risk of damage to the antenna wire is greatly reduced, allowing the TER to be used in waterlogged locations. As the TER enclosure contains no openings and, with the exception of the electronics chassis, is filled with foam, only small amounts of any external gas will be able to enter the housing. By limiting the maximum internal voltages and currents to low values, any internal fault that creates an energy discharge or spark will not be able to create ignition in an external hazardous atmosphere.

As described above, the TER transmit antenna may be entirely enclosed in a small housing in order to make the unit small enough to be easily carried by one person and simple to deploy. The magnetic field produced by the antenna is proportional to the area of the loop, the number of turns and the loop current. The small area of the TER antenna can be compensated by using multiple turns. The inductance of the antenna, which determines the current at a given frequency, is proportional to the square of the number of turns, which cannot be made arbitrarily large. For example, a prototype TER antenna 70×50×9 cm in size and constructed with four separate loops 416, each a spiral of 5 turns and with the loops and individual windings each separated by 2 cm, has an impedance of 1.5 ohms at 4 kHz. When driven by a PWM transmitter with a maximum output voltage of 12V, the AC current in each loop is then 8 A peak. The DC power consumption of the PWM transmitter, which is due to the $I^2R$ loss created by the resistive component of the antenna impedance, is <12 W. At a range of 100 m, this antenna produces a magnetic flux density of 4E-12 T. This is lower than the man-made noise in most urban environments. In order to provide a reliable communications link with this size of antenna, a TTE link that exhibits a high tolerance to man-made noise is used. This is achieved using a modulation method for TTE communications, called Inter-Harmonic Modulation (IHM), that exploits the known characteristics of the TTE channel, and in particular the spectral distribution of the man-made noise.

Figure 6:
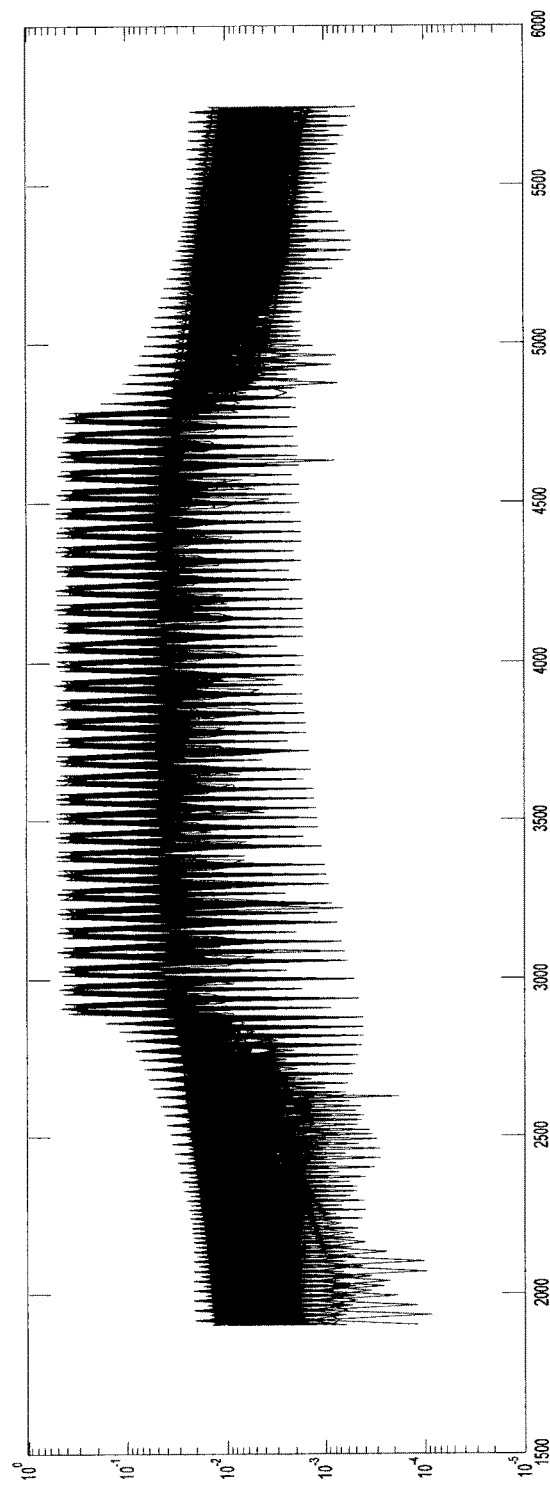
FIG. 6 is a plot of the spectrum of the Inter-Harmonic Modulation signal.

The signal processor 49 of FIG. 4 may perform all modulation and demodulation functions within the TER 3, 5, including synthesis of the IHM waveform which is transmitted over the TTE link. This waveform may comprise a number of separate carrier frequencies, each modulated with symbols representing the input data and overhead bits. The carrier frequencies are located at the inter-harmonic frequencies of the fundamental frequency of the local AC power distribution system, with the frequency of the $M^{th}$ IHM carrier $F_m=(M+0.5)*F_{ac}$, where N is a positive integer with range 0 to N and $F_{ac}$ is the fundamental AC frequency. The modulation symbol rate is set such that the occupied bandwidth of each carrier is less than the inter-harmonic frequency spacing, which is also equal to $F_{ac}$. The magnetic field created by this waveform is thus concentrated at the locations in the frequency spectrum where the noise is lowest, typically 20 to 30 dB below the peak levels, which occur at the AC power harmonic frequencies. FIG. 6 is an exemplary spectrum plot of an IHM waveform with 32 modulated carriers spaced 60 Hz apart. The first carrier is centred on 2730 Hz and the $32^{nd}$ carrier at 4590 Hz.

In some embodiments, the signal processor 49 synthesizes the transmitted signal by performing an inverse Fourier transform on a block of N data and overhead symbols to create N separate modulated carriers. The gross transmission data rate R that is supported by this transmission scheme is given by R=N*S*B, where N is the number of subcarriers, S is the symbol rate, and B is the number of bits per symbol. If Quadrature Phase Shift Keying (QPSK) is used to perform this modulation, B=2 and if a single subcarrier occupies 30 Hz, i.e. 50% of the inter-harmonic spacing, then S=33.3 symbols/s, which results in a data rate of 66.6 bits/s per subcarrier. In order to transmit speech at 600 b/s in two directions (full duplex) at least 18 carriers are required. However, to use an inverse FFT to synthesize the waveform, N should be an integer power of 2. Thus to transmit voice data the minimum number of carriers required is $N=2^5=32$ carriers, providing a gross throughput of 1920 b/s. The additional capacity can be used to carry overhead and signalling data or error correction and detection bits. Forward error correction, for example Reed-Solomon, Convolutional or Turbo codes, can be used to further improve the sensitivity of the receiver since the remaining noise in gaps between harmonics is generally white. During initial synchronization, or for data transmission, the modulation symbol rate can be lowered in order to further reduce the bandwidth occupied by each modulated carrier, for example to 12 Hz or 20% of the inter-harmonic spacing. The bandwidth of the receive filters applied to each modulated carrier can then also be reduced, thus improving the signal to noise ratio of the receiver.

One of the characteristics of waveforms containing multiple carriers is that the peak signal voltage or current can be very high compared to the average signal level. If this high peak results in non-linear operation of the transmit amplifier, the output waveform may become distorted and can create errors in demodulation. For voice communications using a low bit rate voice codec, the Bit Error Rate (BER) should be maintained below <0.2% (2 errors per 1000 bits) in order to prevent a noticeable degradation in intelligibility.

The ratio of the peak to average signal level, or Crest Factor (CF), is proportional to the $\sqrt{N}$, where N is the number of carriers. Usually, to avoid any distortion of the waveform, the maximum transmitter current should correspond to the peak level, but this would result in the average transmitter current being much less than for a single carrier system, resulting in a correspondingly lower signal at the far end receiver. However, the maximum CF rarely occurs. For a waveform with 32 QPSK modulated carriers, a crest factor >2.9, or 9 dB will occur less than 0.2% of the time. The signal can thus be limited or clipped to give a CF of 2.9 without degrading voice quality, but this still results in a 9 dB reduction in the average received signal level compared to a single carrier system. To mitigate this problem, the N data symbols may be allocated to four separate IHM waveforms each containing (N/4) carriers and each waveform is transmitted by one of four separate PWM amplifiers 415, each driven by a separate PWM signals 414 and connected to one of four separate transmit antenna loops 416. This reduces the maximum crest factor in each signal $\sqrt{4}=2$, or 6 dB. The average current in each loop can thus be 6 dB higher, i.e. only 3 dB less than the maximum, but the signal processor must perform 4 separate IFFT operations to synthesize the four separate PWM waveforms.

Figure 7:
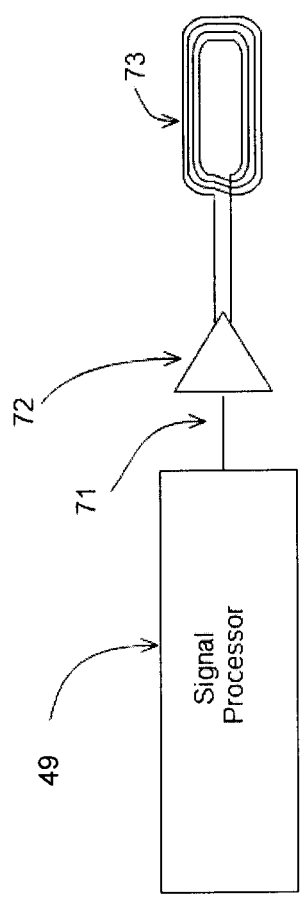
FIG. 7 is a block diagram of an alternative embodiment with a single transmitter and transmit antenna.

In an alternative embodiment a single PWM waveform is used to synthesize all N carriers simultaneously. This exploits the low symbol rates used in the TER link which means that the peaks in the transmitted current are widely spaced in time. In most emergency communications, voice messages are short (<60 seconds) and so the BER need only be maintained at <0.2% for this length of time. Through simulation of the N=32 QPSK system, it has been determined that for a BER of 0.2%, a potentially preferable sensitivity may be obtained when the amplitude is limited such that the peak to average ratio is reduced to 1.4 or 2.9 dB. In this embodiment, the average level of the magnetic field produced by the TER is the same as that of a comparable single carrier system, but the signal processor only has to perform a single IFFT operation, simplifying the processing requirements. In this embodiment, because only one PWM waveform is synthesized by signal processor 49, an alternative transmitter configuration may be used as shown in FIG. 7. In this arrangement, a single PWM signal 71 is generated by the signal processor 49 and the four separate transmitters 415 of FIG. 4 are replaced with a single transmitter 72 driving a single transmit antenna loop 73. To provide the same magnetic field, the antenna loop 73 should have the same area and four times the number of turns as the separate loops 416 shown in FIG. 4. The remainder of the TER block diagram is the same as FIG. 4.

The amplitude and phase response of the TTE channel, which includes the Tx and Rx antennas as well as the propagation path through the earth, can also distort the transmitted waveform. The Tx antenna inductance may cause the current in the transmitter loop to be reduced in proportion to the frequency. Thus for a multi-carrier system with N=2 and a spacing of 60 Hz, the occupied bandwidth is 1920 Hz. If the first carrier frequency is located at 1050 Hz, the highest carrier frequency will be 2910 Hz. At this frequency, the transmitter current, and hence the radiated magnetic field, will be 2.77 times less than at 1050 Hz. Conversely, the Rx antenna output increases as a function of frequency, due to the Faraday effect, so the net effect of the combined antenna responses is to create a roughly uniform amplitude response.

Figure 8:
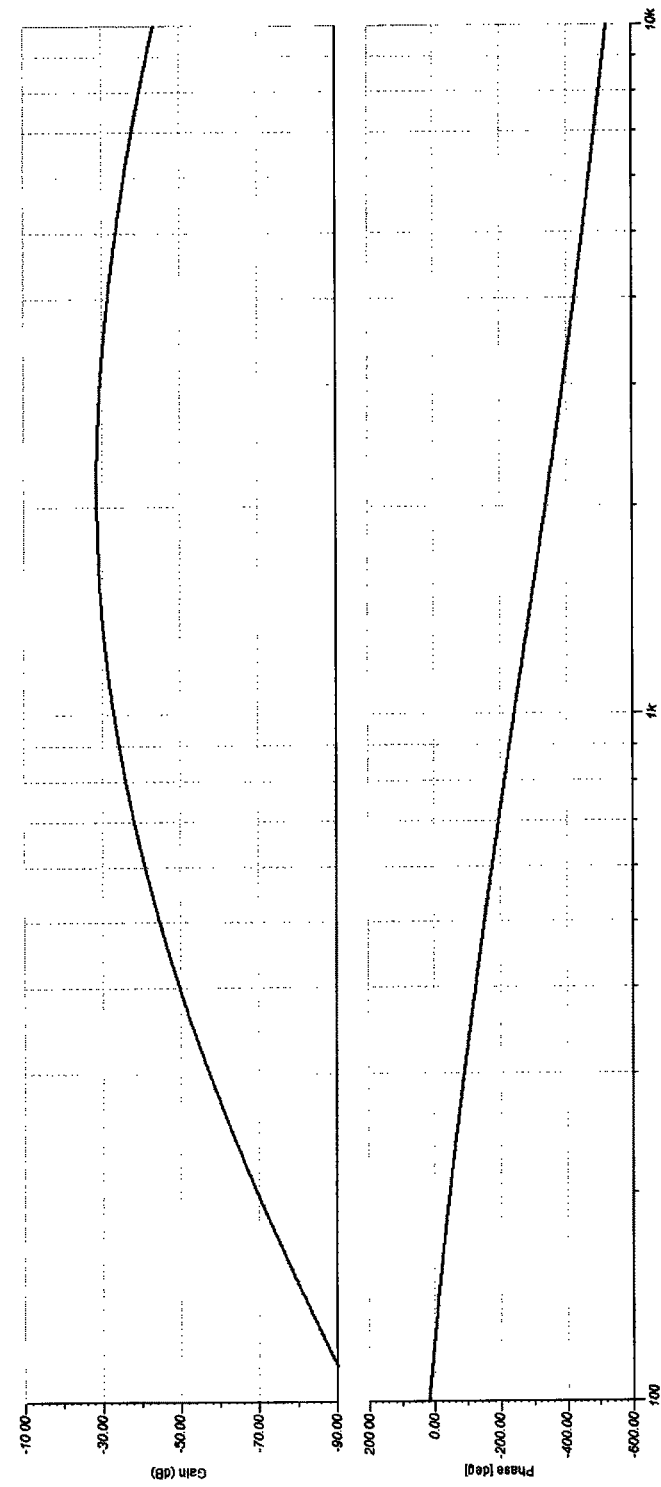
FIG. 8 is a plot of the amplitude and phase of the TTE channel from 100 Hz to 10 kHz.

The response of the TTE channel also has a low pass response due to eddy currents which are produced in the weakly conductive overburden. This attenuation increases with frequency and also with the depth and conductivity of the overburden and can be quite significant, reducing the received signal level at higher frequencies. The receiver may use filters to attenuate the fundamental power line frequency, which may be at a very high level and could cause the receiver to saturate. This low frequency attenuation gives the overall frequency response a band-pass characteristic as illustratively shown in FIG. 8. This plots the overall amplitude and phase variation of a TTE channel with a depth of 100 m and bulk conductivity of 0.02 S/m from 100 Hz and 10 kHz. Between 2 and 4 kHz, the channel exhibits an amplitude variation of 6 dB.

In some embodiments, the signal processor 49 can compensate for the amplitude variation across the TTE channel by adjusting the amplitude of each transmitted carrier to compensate for the non-uniform amplitude characteristic of the transmit antenna, receiver and Through-the-Earth transmission path. Because the effects of the TX and RX antennas cancel out and the frequency response of the receiver filters is known, the variation in the response is determined by the depth and conductivity parameters of the Through-the-Earth transmission path. The amplitude adjustment applied to each carrier can be calculated automatically by the signal processor from the known receiver response and the parameters of the Through-the-Earth transmission path. These parameters are input into the system via a user interface or application provided on the external mobile radios. Alternatively the amplitude distortion may be estimated from the relative amplitudes of the carriers received from the opposite end of the link.

The TTE channel may also create a phase shift between the transmitter and receiver, which varies over the bandwidth of the transmitted IHM waveform. The variation in phase as a function of frequency creates a group delay which can cause the received symbols to be overlapped, resulting in inter-symbol interference. This group delay may be automatically calculated by the signal processor from the receiver and antenna frequency responses and depth and conductivity of the TTE path which may be entered as described above. The signal processor may eliminate the inter-symbol interference by appending a cyclic prefix to each transmitted block of data, where the length of the cyclic prefix is >2 times the maximum estimated group delay.

As per the above, the communication method termed Inter-Harmonic Modulation may be used to allow Through-the-Earth communications in the presence of man-made noise by exploiting the known spectral distribution of this noise. In some embodiments, the method comprises the steps of determining the fundamental frequency of the AC power line noise; inputting of a data stream representing a text message, digitally coded voice or other data; and performing an inverse Fourier transform on a block of N data and overhead symbols to create a single Inter-Harmonic Modulation waveform containing N separate modulated carriers, where the frequency $M^{th}$ carrier $F_m=(M+0.5)*F_{ac}$, where M is a positive integer with range 1 to N and $F_{ac}$ is the fundamental AC frequency.

The method may also comprise the step of estimating the operating depth and bulk conductivity of the TTE channel. Error detection or correction bits, and/or other overhead bits, may be added to the data. The waveform may be converted to one or more PWM signals and these PWM signals may be used to control the output from a PWM transmitter connected to one or more loop antennas. The IHM magnetic field may be detected at a receiver using one or more loop antennas. The received signals may be amplified and/or filtered to remove out of band interference. The signals from the loop antennas may be combined to maximize the signal to noise ratio at the receiver. An FFT operation may be performed on the received IHM signal to recover the transmitted data and overhead symbols. The data stream may be re-assembled to provide an output in the form of a text message, digitally coded voice or other data.

In an aspect embodiments described herein provides devices that communicate by use of a multicarrier modulation method as a means of improving the SNR on a given link.

The devices may transmit data over a multiplicity of mathematically related carriers such that the signal lies between the harmonic frequencies of man-made noise.

The devices may use heavy amplitude limiting to obtain a high power efficiency.

As an illustrative example, the optimum crest factor for mine emergency communications with short text messages and voice codecs operating below 2400 bps may be 1.4, or in a range of 1-20, or otherwise depending on circumstantial parameters (e.g. implementation for mine communications).

In an aspect embodiments described herein provides devices that use error correction coding (such as Reed-Solomon coding, for example) to correct data errors caused by amplitude clipping.

Figure 9:
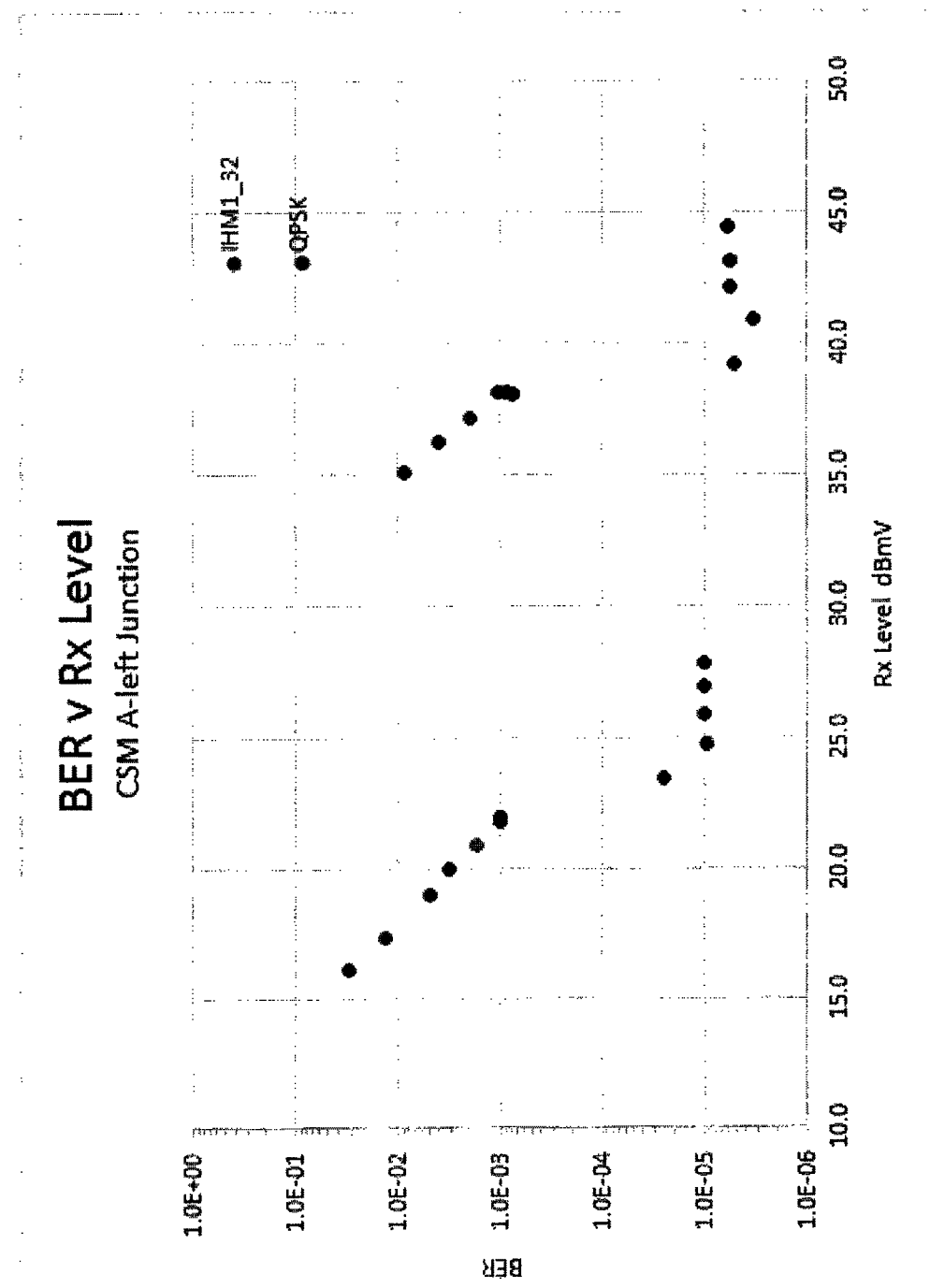
FIG. 9 is an illustrative graph of test results.

FIG. 9 is an illustrative graph of test results. For this illustrative example, the graph plots Bit Error Rate vs. normalized signal level for IHM and QPSK modulation. For this example, the graph shows the bit error rate BER vs. Rx signal level at an experimental location. With 32 carriers, the new IHM modulation method provides an acceptable BER for emergency communications of 0.1% (1.0E-3) at a normalized signal level 16 dB lower than needed by the conventional single carrier QPSK modulation method. This is an illustrative, non-limiting example of an aspect of various embodiments described herein.

While illustrated in the diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present invention can be carried out as a method and can be embodied in a system or on a computer readable medium. The embodiments of the invention described above are intended to be exemplary only.

The invention claimed is:

1. A method of providing a Through-the-Earth (TTE) communication link, the method comprising:
   determining a fundamental frequency of an alternating current (AC) power line noise; inputting a data stream representing a text message, digitally coded voice or other data; performing an inverse Fourier transform on a block of N data and overhead symbols to create a single Inter-Harmonic Modulation (IHM) waveform containing N separate modulated carriers, where a frequency Mth carrier $F_m=(M+0.5)*F_{ac}$, where M is a positive integer with a range of 1 to N and $F_{ac}$ is a fundamental AC frequency, wherein N is a positive integer;
   converting the waveform to at least one pulse-width-modulation (PWM) signal;
   controlling an output from a PWM transmitter connected to one or more loop transmit antennas using the at least one PWM signal; and
   transmitting a signal comprising the N separate modulated carriers to a receiver.

2. The method of claim 1, further comprising detecting an IHM magnetic field at the receiver using at least one loop antenna and amplifying and filtering a received signal to remove out of band interference.

3. The method of claim 1, further comprising combining signals from two or more loop antennas to maximize a signal to noise ratio at the receiver.

4. The method of claim 1, further comprising performing a fast-Fourier transform (FFT) operation on a received IHM signal to recover transmitted data and overhead symbols.

5. The method of claim 1, further comprising re-assembling the data stream to provide an output in the form of a text message, digitally coded voice or other data.

6. The method of claim 1, further comprising using a multicarrier modulation technique to improve the SNR on a communication link.

7. The method of claim 1, further comprising transmitting data over a multiplicity of mathematically related carriers such that the PWM signal lies between the harmonic frequencies of man-made noise.

8. The method of claim 1, further comprising using heavy amplitude limiting to obtain a high power efficiency.

9. The method of claim 8, further comprising transmitting data using text messages and voice codecs operating below 2400 bps using a crest factor proximate to 1.4.

10. The method of claim 8, further comprising using error correction coding to correct data errors caused by amplitude clipping.

11. A method of providing a Through-the-Earth (TTE) communication link, the method comprising:
    determining a fundamental frequency of an alternating current (AC) power line noise;
    inputting a data stream representing a text message, digitally coded voice or other data;
    performing an inverse Fourier transform on a block of N data and overhead symbols to create a single Inter-Harmonic Modulation (IHM) waveform containing N separate modulated carriers, where a frequency $M^{th}$ carrier $F_m=(M+0.5)*F_{ac}$, where M is a positive integer with a range of 1 to N and $F_{ac}$ is a fundamental AC frequency;
    detecting an IHM magnetic field at a receiver using at least one loop antenna and amplifying and filtering a received signal to remove out of band interference; and
    transmitting the received signal.

12. The method of claim 11, further comprising combining signals from two or more loop antennas to maximize a signal to noise ratio at the receiver.

13. The method of claim 11, further comprising performing a fast-Fourier transform (FFT) operation on a received IHM signal to recover transmitted data and overhead symbols.

14. The method of claim 11, further comprising re-assembling the data stream to provide an output in the form of a text message, digitally coded voice or other data.

15. The method of claim 11, further comprising using a multicarrier modulation technique to improve the SNR on a communication link.

16. The method of claim 11, further comprising transmitting data over a multiplicity of mathematically related carriers such that the signal lies between the harmonic frequencies of man-made noise.

17. The method of claim 11, further comprising using heavy amplitude limiting to obtain a high power efficiency.

18. The method of claim 17, further comprising transmitting data using text messages and voice codecs operating below 2400 bps using a crest factor proximate to 1.4.

19. The method of claim 17, further comprising using error correction coding to correct data errors caused by amplitude clipping.

20. A method of providing a Through-the-Earth (TTE) communication link, the method comprising:
- determining a fundamental frequency of an alternating current (AC) power line noise;
- inputting a data stream representing a text message, digitally coded voice or other data;
- performing an inverse Fourier transform on a block of N data and overhead symbols to create a single Inter-Harmonic Modulation (IHM) waveform containing N separate modulated carriers, where a frequency $M^{th}$ carrier $F_m=(M+0.5)*F_{ac}$, where M is a positive integer with a range of 1 to N and $F_{ac}$ is a fundamental AC frequency;
- combining signals from two or more loop antennas to maximize a signal to noise ratio at a receiver; and
- transmitting the combined signals.

21. The method of claim 20, further comprising performing a fast-Fourier transform (FFT) operation on a received IHM signal to recover transmitted data and overhead symbols.

22. The method of claim 20, further comprising re-assembling the data stream to provide an output in the form of a text message, digitally coded voice or other data.

23. The method of claim 20, further comprising using a multicarrier modulation technique to improve the SNR on a communication link.

24. The method of claim 20, further comprising transmitting data over a multiplicity of mathematically related carriers such that the signals lie between the harmonic frequencies of man-made noise.

25. The method of claim 20, further comprising using heavy amplitude limiting to obtain a high power efficiency.

26. The method of claim 25, further comprising transmitting data using text messages and voice codecs operating below 2400 bps using a crest factor proximate to 1.4.

27. The method of claim 25, further comprising using error correction coding to correct data errors caused by amplitude clipping.

\* \* \* \* \*